Figure 1:
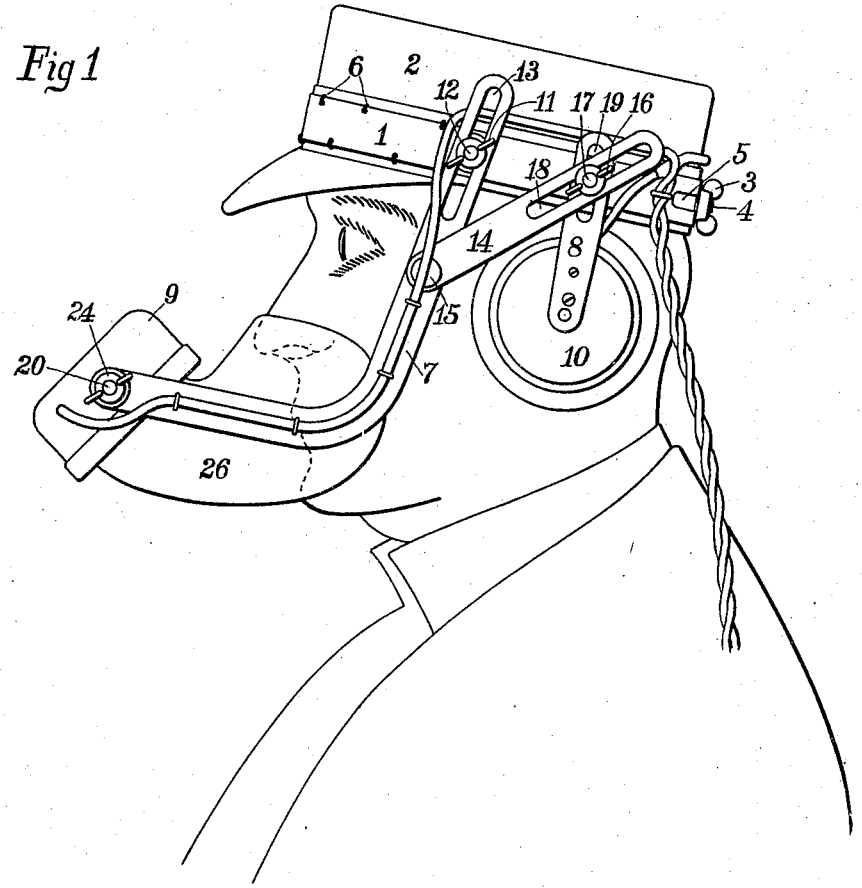

M. R. HUTCHISON.
INTERCOMMUNICATING TELEPHONIC APPARATUS.
APPLICATION FILED MAY 21, 1909.

1,085,916.

Patented Feb. 3, 1914.

4 SHEETS—SHEET 1.

WITNESSES:

INVENTOR.
Miller Reese Hutchison
BY
G. C. Llean ATTORNEY.

M. R. HUTCHISON.
INTERCOMMUNICATING TELEPHONIC APPARATUS.
APPLICATION FILED MAY 21, 1909.
1,085,916.
Patented Feb. 3, 1914.
4 SHEETS—SHEET 2.
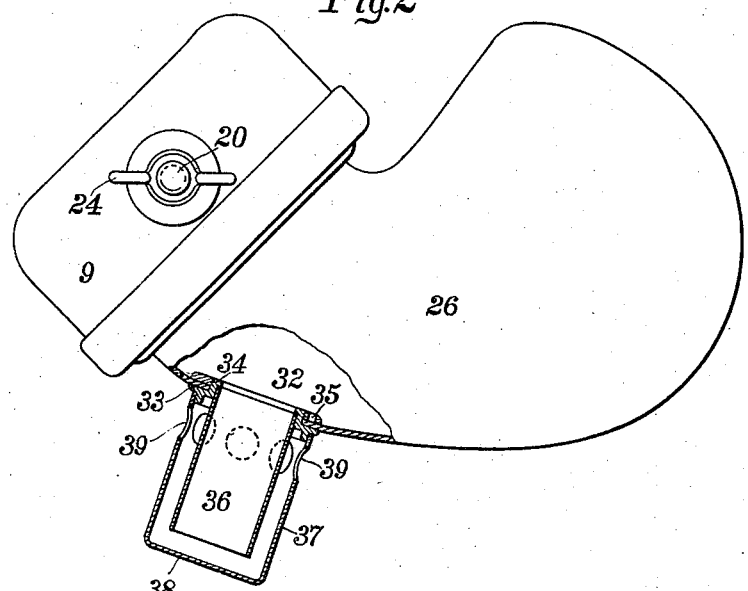
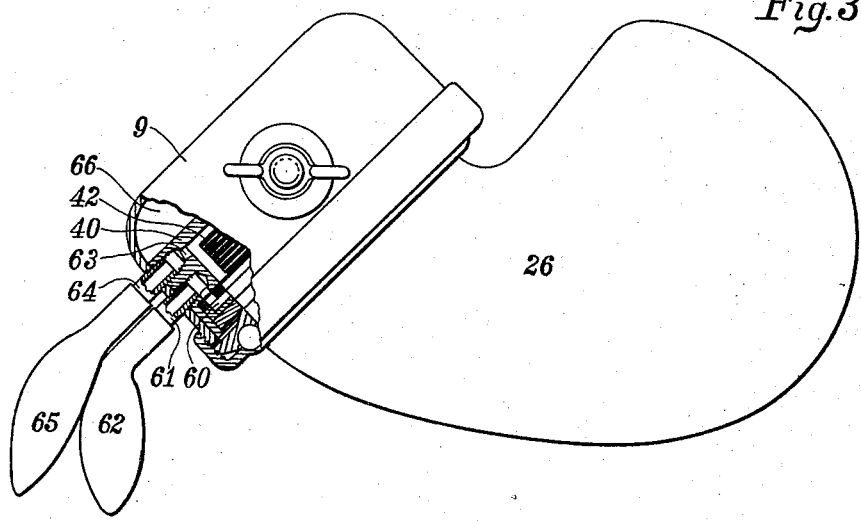
WITNESSES:
INVENTOR.
Miller Reese Hutchison
BY
G. C. Dean ATTORNEY.

M. R. HUTCHISON.
INTERCOMMUNICATING TELEPHONIC APPARATUS.
APPLICATION FILED MAY 21, 1909.
1,085,916.
Patented Feb. 3, 1914.
4 SHEETS—SHEET 3.
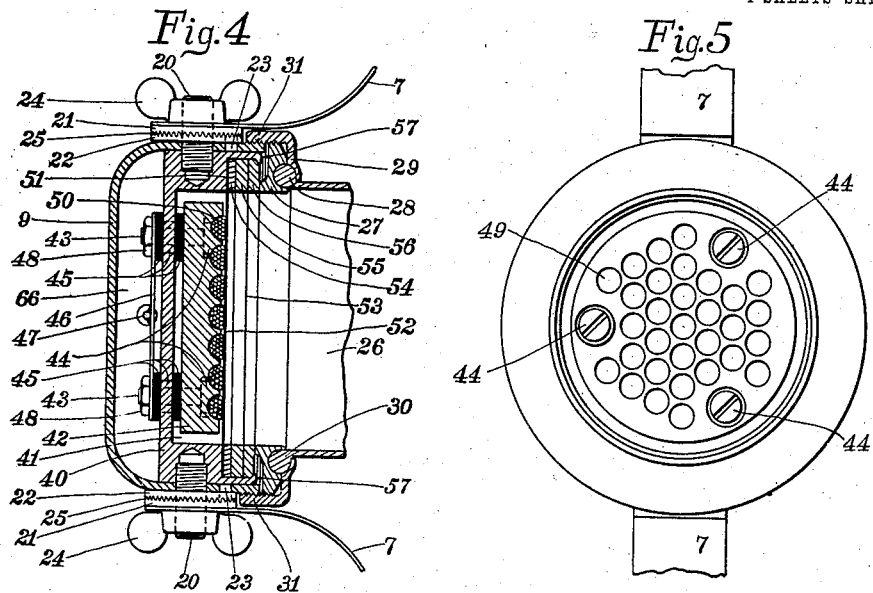
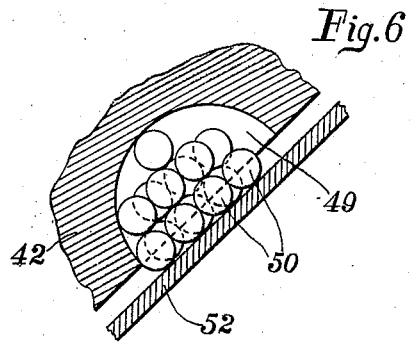
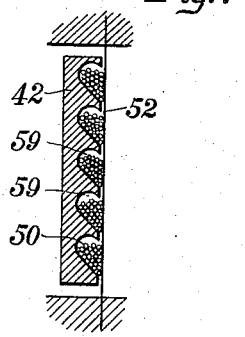
WITNESSES:
INVENTOR.
Miller Reese Hutchison
BY
G. C. Klean ATTORNEY.

M. R. HUTCHISON.
INTERCOMMUNICATING TELEPHONIC APPARATUS.
APPLICATION FILED MAY 21, 1909.
1,085,916.
Patented Feb. 3, 1914.
4 SHEETS—SHEET 4.
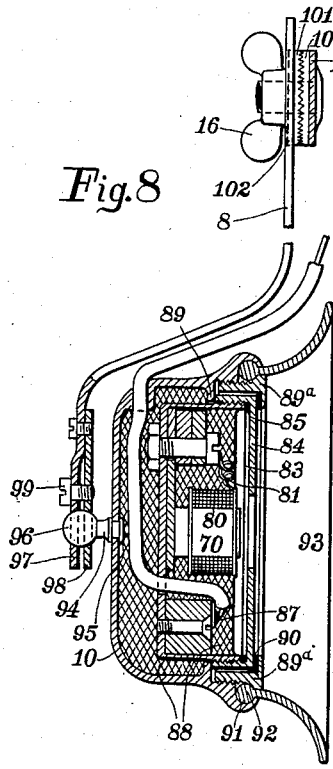
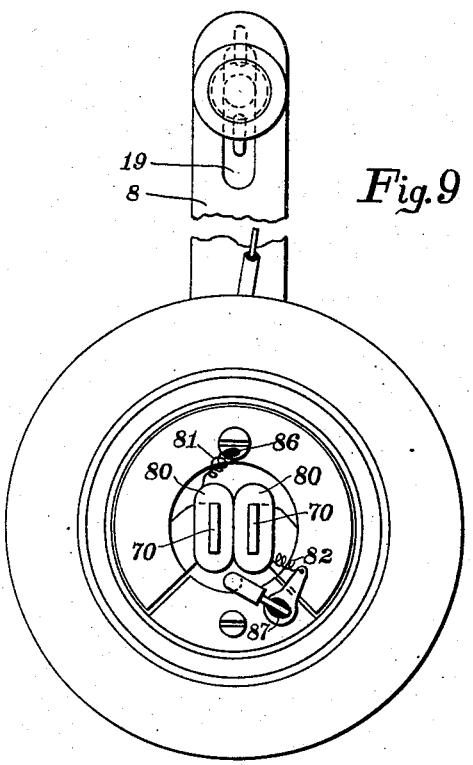

UNITED STATES PATENT OFFICE.

MILLER REESE HUTCHISON, OF SUMMIT, NEW JERSEY.

INTERCOMMUNICATING TELEPHONIC APPARATUS.

1,085,916.  Specification of Letters Patent.  Patented Feb. 3, 1914.

Application filed May 21, 1909. Serial No. 497,459.

*To all whom it may concern:*

Be it known that I, MILLER REESE HUTCHISON, a citizen of the United States, and a resident of Summit, in the county of Union and State of New Jersey, have invented certain new and useful Improvements Relating to Intercommunicating Telephonic Apparatus, of which the following is a specification.

My present invention relates to specialized apparatus for telephonic intercommunication wherein the construction and arrangement is such as to render the apparatus capable of use under adverse conditions of extraneous mechanical and acoustic vibration, or of wind and weather.

While it will be obvious to those skilled in the art that various features of my invention hereinafter disclosed are capable of wide application, the general purpose in view has been the organization of an efficient telephonic system of intercommunication for fortifications, battle fields, battle ships, industrial plants, etc., capable of efficient use under all conditions, especially where more or less precise operations or evolutions must be directed or controlled under conditions of noise, confusion, or excitement. One of the most desirable, and at the same time most trying uses which I contemplate is that of telephonic intercommunication on a battle ship during gun fire for the purpose of transmitting orders and imparting information as to the direction and time of fire, and particularly as to the range and bearing of a hostile ship or other target. When my system is thus used for fire control on a battle ship, the spotter or range finder may be located on the mast or other elevated station of the battle ship, and he is able to communicate continuously and directly to the various gun crews the shifting range and other information or orders necessary for prompt and efficient gun fire. He may similarly control the direction and time of torpedo fire. In order that the apparatus may operate successfully for such purposes, it is necessary that the transmitter be capable of responding to and intelligibly transmitting speech, notwithstanding the mechanical vibration of the ship and concussion and discharge of the heaviest batteries.

I prefer to secure the transmitting and receiving instrument to the person of the user, preferably to a head piece, which may be the regulation cap, and I also preferably provide means for concentrating the sound waves of the voice and carrying them directly to the transmitter. The sound concentrating means also serves as a shield to keep out disturbing vibrations. Distinct articulation and clear transmission of speech may be promoted when necessary or desirable by arranging the sound concentrator and shield so that it will inclose the nasal orifices as well as the mouth, thus preserving the important nasal sounds, as well as those of the throat and mouth. In such case a vent should be provided for breathing purposes. This is preferably of such form as to permit ready passage of the air and at the same time to break up or smother extraneous sound waves, which might otherwise reach the diaphragm through the vent, in sufficient volume to interfere with its operation. The transmitter is preferably arranged to have special electrical qualities whereby loud sounds and faint sounds are reproduced at the receiver equally well. That is to say, the transmitter is purposely so constructed as to distort speech by magnifying the sibilants, low sounds, and overtones, while decreasing the effect of the louder sounds and fundamentals. Such a transmitter is especially desirable because it commonly happens that under the nerve racking conditions of battle or even of target practice, the spotter will unconsciously raise his voice to such an extent that an ordinary telephone apparatus would respond only with an unintelligible roar at the receiver. On the other hand, it may happen that during times of trying service, the operator may be forced by physical weakness or suffering from wounds, to speak so low that his voice would be inaudible or unintelligible with the ordinary apparatus, whereas my apparatus will satisfactorily work under both conditions. The transmitting and receiving sets may be wired up to each other and to the battery in any known or desired way, but I prefer to connect the transmitter of the observation or control station in series with the receiver of the gun crew stations, and provide parallel branches having transmitters of the latter in series with the receiver of said central station.

Having briefly explained some of the purposes and features of my invention, I will now proceed to describe in detail certain useful embodiments thereof, having special reference to the accompanying drawings, wherein—

Figure 1 is a side view of a desirable form of transmitter and receiver set secured upon the person of the operator in position for use. Fig. 2 is a side elevation of the transmitter and sound concentrator, showing in vertical section the sound excluding construction of the breathing vent. Fig. 3 is a similar view showing means for equalizing concussion and other stresses on the front and rear sides of the transmitter diaphragm. Fig. 4 is an axial sectional detail of the transmitter. Fig. 5 is a face view of the rear electrode of the transmitter. Figs. 6 and 7 are detail views of modified arrangements of transmitter electrodes and the microphonic carbon balls. Fig. 8 is an axial sectional view of the receiver. Fig. 9 is a face view of the receiver with the diaphragm removed.

It will be understood that while the said drawings and the description thereof contained herein, disclose with considerable particularity certain specific forms in which my invention may be usefully embodied, it will be understood by those skilled in the art that various omissions, substitutions, and changes in the forms, proportions, sizes, and details of the device and of its operation, may be made without departing from the spirit of my invention.

In Fig. 1 I have shown the receiver and transmitter with sound concentrators and wiring mounted in a convenient manner upon the head piece or cap of the user, in such manner as to leave the hands free for manipulation of range finders and other instruments, while the field of vision is unobstructed. I preferably utilize the regulation cap as the support for these instruments, since it is very desirable that the head and eyes of the observer be not deprived of their customary protection. The band 1, of metal or other suitable material, is secured to the cap 2 by a clamp nut 3, screwing upon bolt 4, projecting through slot 5. Where desired, the band may also be provided with supplemental securing means, as, for instance, by stitching as at 6, 6. To the band 1 are adjustably secured the transmitter supports 7 7 and receiver supports 8, 8, for holding the transmitter 9 and receiver 10 in position to fit the head contour of the operator.

Each transmitter support 7, 7 is adjustably secured by a nut 11 on screw 12, which extends from the band 1, through slot 13.

The point of this connection is near the rear of the vizor of the cap and preferably at or near the vertical plane of the temples of the wearer. The slot and screw-nut connections permit of vertical as well as angular adjustment of the supports 7, 7. A brace 14 is preferably pivoted at 15 to the transmitter support 7, and adjustably held by clamping nut 16 on screw 17, extending through slot 18 in said brace 14. The nut 16 and screw 17 are preferably utilized for the further purpose of securing the receiving support 8 in its desired position. This support 8 is also capable of vertical and angular adjustment by reason of the slot 19, which engages said screw 17. The various supports and braces are preferably of spring metal.

The transmitter support 7 extends downwardly, preferably across the cheek bones, to about the region of the mouth, and thence forwardly and inwardly to the transmitter 9, which is pivotally clamped between the ends of said supports 7. In order that the pivotal connections may be securely locked against rotary displacement, I prefer to employ a positive locking connection, such as is shown in Fig. 4. In said figure, the pivotal screw studs 20, 20 are rigidly screwed into the transmitter and washers 21, 22, having engaging faces toothed as at 25, are interposed between the transmitter supports 7, 7 and the transmitter 9. The washers 22, 22 are locked against rotary motion with respect to the transmitter by means of the eccentric studs 23, 23, and the washers 21, 21 are rigidly held with respect to the support 7, 7 by being brazed or otherwise secured thereto. The washers 21, 21 and washers 22, 22 being thus nonrotatably fixed to their respective members, the parts may be locked in any desired angular relation by simply screwing up the nuts 24.

The shield 26 for concentrating the voice of the operator and for excluding extraneous sounds, is secured to the transmitter 9 in any desired manner. A convenient arrangement for this purpose consists of an annular clamp, comprising a screw ring 27, provided with an annular recess 28, screwed into clamping engagement with a flanged ring 29. These two rings have clamped between them a bead 30, formed or molded on the cylindrical end of the sound concentrator. The two clamping members thus secured to each other, are then secured over the mouth of the transmitter by a screw threaded extension 31 of the annular ring 29.

The sound concentrator may be formed of soft lead, and may be edged with rubber or leather to form a face engaging portion. Preferably, however, the entire concentrator is formed of rubber of suitable texture. In either case, the concentrator is preferably circular in cross-section at the transmitter end, and at the other end formed so as to fit the mouth and nose of the operator. When formed so as to include the nose, I prefer to provide a breathing vent, as shown in Fig. 2, so that the apparatus may remain permanently in position without interfering with the breathing of the operator. In order that there may be free flow of air without rendering the device inoperative by reason of violent noises of gun fire, etc., such as would readily pass an unprotected opening, I prefer to employ some such arrangement as shown in Fig. 2. In this figure, the opening 32 in the concentrator 26 is surrounded by an annular flange 33, provided with a screw threaded projection 34 of smaller diameter, upon which is screwed the clamping ring nut 35. Secured to the inner face of the screw threaded projection 34, is a downwardly extending open ended cylinder 36. Outside of the cylinder 36 and concentric therewith, is secured a larger cylinder 37, closed by a bottom 38, adjacent the lower end of cylinder 36, and provided with ventilating openings 39 at points remote therefrom. By this arrangement ample space is afforded for ingress and egress of the air necessary for breathing without the possibility of developing a tendency either to a vacuum or a plenum in the sound concentrator, at the same time extraneous sound waves are broken up by the perforations 39 and the labyrinthian walls 37, 38, 36.

The internal construction and the microphonic qualities of the transmitter are especially designed and adapted for the purpose of transmitting speech intelligibly, whether emitted as a shout or as a whisper.

Heretofore, in my work on transmitters for making speech intelligible to the deaf, I have succeeded in producing transmitters which are extremely sensitive to normal sounds, and entirely unresponsive to very intense sounds, but the specific method of operation whereby this result was achieved renders it impossible to apply the deaf machine microphone to my present purposes, unless or until modified in accordance with my present discovery and invention. In the deaf machine microphone, I use a small carbon disk having a few hemispherical cavities in its outer face, near the center of the diaphragm. These cavities each contain a number of carbon balls or relatively large spheres. Over the openings of the cavities, parallel with the face of the carbon disk and as close to it as may be and yet permit sufficient clearance for acoustic vibration, is arranged a thin carbon diaphragm connected as the front electrode of the microphone. The cavities, the surface of the diaphragm adjacent thereto, and preferably also the balls or spheres are polished. When this arrangement of carbon block diaphragm and balls is placed in a vertical position, the the balls or spheres tend to roll out of the cavities against the diaphragm, thereby providing a loose and very sensitive microphone contact. An important feature of this prior construction is that the hemispherical cavities are grouped in a relatively small area at or adjacent the center of the diaphragm where its amplitude of vibration is greatest, the greater proportion of the area of the diaphragm toward the periphery being left unprovided with microphonic contacts. With the microphonic contacts comparatively localized adjacent the center of the diaphragm, a loud noise or a strong vowel sound causing great amplitude of vibration of the diaphragm causes the carbon balls to jump or move bodily so as to destroy their bridging relations with the diaphragm and carbon block, thereby rendering such balls inoperative so far as concerns the functions of microphonic amplification of speech variations. On the other hand, the whispering sibilants and faint overtones permit the balls to remain in their microphonic position and condition wherein they most efficiently magnify the fainter vibrations. I have discovered that this restricted arrangement of the cavities near the center of the diaphragm, is comparatively useless for my present purpose, because under practical conditions of battle, where there are tremendous extraneous sound vibrations and where the operator is liable to shout into the transmitter, the vibrations at the center of the diaphragm are frequently great enough to drive practically all of the balls at the center out of operative microphonic relation to the front and back electrodes, thereby rendering the transmitter temporarily useless. I have discovered, however, that by increasing the diameter of the back electrode and by providing an extended area of hemispherical cavities suitably distributed over the area toward the periphery of the diaphragm, there will always be an adequate number of cavities whereof the balls are agitated to just the right extent to produce the best microphonic effects. This will be evident from the fact that the amplitude of vibration of the diaphragm is greatest at the center and is progressively less outwardly from the center. It follows that for ordinary conditions of very slight vibration of the diaphragm, the balls near the center will be agitated just enough to give a satisfactory microphonic amplification, while the vibration of the diaphragm at points near the periphery will be so small that the microphonic action at those points will be relatively insignificant. As the amplitude of vibration of the diaphragm increases by reaon of a louder sound, the microphonic contacts at the center will gradually go out of operation, while those toward the periphery begin to be agitated just enough to produce the best microphonic action.

From the above it will be seen that one of the features of my invention consists in so distributing the microphonic contacts over the face of the diaphragm that there will always be active regions of maximum microphonic amplification no matter how great may be the vibration of the diaphragm at the center.

I may have microphonic contacts at the center of the diaphragm, as well as toward the periphery, in order that faint whispers may be intelligibly transmitted, but as between the two, the contacts away from the center are on the whole more important, and in certain cases, I may arrange the contacts in an annulus with none at the center of the diaphragm. There seems to be a certain annular region a slight distance inward from the periphery, where widely varying intensities of speech seem to produce approximately equal vibratory displacements, so that when the microphonic contacts are arranged in this annulus, the soft sounds are magnified and the loud sounds decreased to approximate equality.

I have found that it is desirable to use a large number of balls and spheres over a large area of the diaphragm, and by dividing them thus into small groups in separate cavities, can obviate the tendency to pack which exists in granular carbon transmitters, wherein a comparatively large body of granular carbon is used with electrodes of large area and the device is used with the diaphragm in a vertical position.

The above principles of operation are embodied in the arrangement shown in the drawings, particularly in Figs. 4 and 5. In said figures is shown a back electrode cup or support 40, which may be a brass or aluminum casting, formed with a cavity 41, containing the carbon block constituting the back electrode 42. This carbon block is held in position within the cavity by bolts 43, having heads 44 countersunk or recessed in the face of said block and the shanks extending through the back side of the casting 40. As shown in the drawing, insulating bushings and washers, as at 45, are employed. Two of said bolts are connected by a conducting bridge piece 46, to which is secured, by soldering or otherwise, one of the terminals 47 of the line connections. These parts are held in place by nuts 48. The microphonic cavities 49, containing the microphonic balls or spheres 50, are formed in the front face of the back electrode 42. These cavities may be distributed over the face of the electrode somewhat after the manner indicated in Fig. 5, wherein it will be seen that annular zones taken at successively increasing distances from the center of the diaphragm, show a progressively increasing microphonic area extending well out toward the periphery of the diaphragm.

The casting 40 is formed with a plain annular seat 51, upon which rests a thin sensitive carbon diaphragm 52. The block 42, washers 45, and casting 40 are so proportioned and relatively arranged that the diaphragm 52 is substantially parallel with the front face of the back electrode 42 and is separated therefrom by a space only sufficient to permit of the maximum desired vibration of the diaphragm. The balls or spheres 50 are made large enough so that they will not escape from their cavities and become lodged between the face of the diaphragm and the block, even when the diaphragm vibrates at its maximum amplitude. The thin carbon diaphragm which I find to be the best for articulation, is exceedingly porous and absorbs moisture from the air very quickly. The effect of this when passing considerable current as is necessary for satisfactory operation, is to produce whistling sounds in the transmitter, which tend to obscure speech and thus impair the effectiveness of the system. For my present purpose, I find it necessary to protect the diaphragm from all moisture. To this end, it may be covered with a layer of waterproof varnish. This acts fairly well for a time, but under conditions of constant use and vibration, such waterproofing is liable to break down. Moreover, the amount of varnish or other material necessary for the purpose considerably increases the weight of the diaphragm, thus adding to its inertia and increasing its time period. This necessitates using a thinner diaphragm for a given periodicity and the thinner the diaphragm is, the weaker and more liable it is to be broken by shocks or concussions imparted either by accidental blows upon the case or by discharge of heavy artillery. Moreover, if the diaphragm is made thin, the waterproofing material, which is usually more or less non-conducting, is liable to permeate through to the rear side of the diaphragm and impair its efficiency as a microphone. For the above and other reasons, I prefer to protect the diaphragm, whether waterproof or not, from all possible access of moisture, as well as from mechanical or acoustic abuse, by arranging a thin sensitive diaphragm 53, preferably of non-corrosive metal, such as Tobin bronze, in front of said carbon diaphragm 52. Over the carbon diaphragm 52 is placed a cork washer 54, which in turn is clamped in place by washer 55, forced into the casting 40. Upon this rests the diaphragm 53, which in turn is clamped in place by the washer 56. The washer 56 is secured in place and the joint rendered water tight by spinning over the flange of casting 40, as at 57. The supplemental diaphragm protects the carbon diaphragm from moisture of the breath or of the weather, and the space between the diaphragm serves as a cushion to protect the carbon diaphragm from the effects of acoustic concussion. Washers 56 and 54 may be of brass instead of cork, if desired.

The mouth piece 26, heretofore referred to, may be of the conventional form commonly employed upon telephone transmitters, but it is preferably formed as a complete shield to inclose both mouth and nose. In the latter case, it is cut away to fit the face and sides of the nose of the operator, thus concentrating the sound of his voice, excluding extraneous sounds, and also in case of bad weather, excluding rain or spray. If formed of lead, this shield may be bent or made so as to fit the face of the particular individual who is to use it, but I prefer to form the face fitting portion of the shield of soft rubber, so that it may be readily deformed and forced into contact with the irregularities of the face, without causing unnecessary physical inconvenience to the wearer.

As the conditions of actual use of the transmitter in the manner above described, require that the operator be free to look upward or downward, it is desirable that the transmitter be somewhat inclined forwardly when the operator's face is in the normal position, as in Fig. 1, for otherwise the microphonic balls would roll backward into the cavities 49 out of contact with the diaphragm 52 whenever the operator's face is turned downwardly. This brings the balls or spheres to the position shown in Fig. 6.

In certain cases the transmitter may be adapted for use through a considerable range of rearward inclination by forming the cavities on an upward slant, as shown at 59, in Fig. 7. With this construction, the transmitter may be arranged with its diaphragm normally vertical and yet the operator may turn his face downward through a considerable angle before the balls 50 will roll out of operative engagement with the diaphragm 52.

The carbon diaphragm is more or less frail, and under unusual stresses somewhat brittle; moreover, it is close to the rear electrode 42. Hence, durability and sensitiveness both require that the atmospheric pressure on both sides of the diaphragm be approximately the same. To this end, I may utilize the arrangement shown in Fig. 3, wherein a passage 60 communicates from the front side of the diaphragm to a screw threaded nipple 61, terminating in a bag 62, which serves as a reservoir of air at atmospheric pressure. This bag is preferably of thick flexible rubber which will not transmit exterior air vibrations nor permit the entrance of moisture. A similar passage 63 leading from the rear side of the diaphragm, connects with a screw threaded nipple 64, terminating in a flexible bag 65, similar to 62. It will be obvious that the nipples 61, 64, might communicate with a single bag or flexible passage, or the passages 60, 63 might be joined directly. The latter expedient would equalize the pressure on both sides of the diaphragm, but would not maintain the diaphragm cavity itself at the same pressure as that of the external atmosphere.

The space 66 at the rear of the casting 40 and between it and the transmitter case 9, may be filled with an insulating compound of the character employed in the art for such purposes. A composition suitable for the purpose should be such as may be liquefied by heat so that it can be poured into the cavities and will harden upon cooling. There are many composition of this class employed for insulating induction coils, transformers, etc.

For a receiver, I may use any known or desired instrument, such as may be purchased in the open market. It should comprise an electromagnet consisting of iron cores 70, 70, energized by coils 80, 80, connected to the line conductors by suitable means, such as wires 81, 82. The diaphragm 83 may be secured in place by cap 84, screwed down on the washer 85. The conducting connections are preferably soldered in place as at 86, 87 and the case is then filled with hardened insulating compound 88, which may be of the general character above described. This conventional receiver case may be mounted for my purposes in an exterior case 10, which is formed with an inwardly projecting flange 89, closely fitting the receiver case and serving as a clamping member for engaging the edge of the flange or screw cover 84. The other member of the clamp is formed by screw ring 89ª, having an inwardly projecting flange pressing upon the outer face of the cover 84, through an intervening washer 90. The case 10 is formed at its front edge with an annular recess 91, engaging a head 92, formed or molded upon a shield or concentrator 93, adapted to fit over the ear and against the head so as to exclude water and extraneous sounds after the manner of the mouth and nose piece previously described. The shield 93 is preferably of soft rubber.

The case 10 is secured to the support 8 previously described, in any desired way, preferably by a universal joint, which will permit the head engaging shield to accommodate itself to the person of the wearer.

As shown in the drawing, the stud 94 is riveted as at 95, to the center of the back of the case 10. This stud has a spherical outer head 96, fitting a spherical socket, shown as consisting of oppositely concaved clamping members 97, 98, which are held in adjustable frictional engagement with the sphere 96 by means of the screw 99.

The upper end of the support 8, slotted as at 19, may be adjusted vertically and angularly by loosening the nut 16. The angular adjustment is maintained by positive interlocking engagement of washers having tooth engaging faces similar to those shown at 21, 22, Fig. 4. In the present case, the washer 100 is brazed or otherwise secured to the band 1 and the washer 101 is held from rotation with respect to the support 8 by means of a key or spline projection 102 extending into the slot 19. Similar washers are used to lock support 7 to band 1.

The above transmitter and receiver outfit meets all the practical requirements for a telephonic fire control system on a battleship. The man who is operating the range finder has his vision unobstructed in all directions, his head is not limited as to its movement relatively to the body, and yet he may telephone continuously his ranges and other information at the very instant his observation is made. He does not have to dispense with the protection from sun or rain afforded by a cap. The line connections are out of the way where they do not embarrass any of his movements.

With the above described outfit, one or both of the receivers may be displaced to leave one ear free, or permanently removed so as to leave one ear free at all times. Similarly, the outfit may be adapted for use in a turret or at the guns by displacing or removing the transmitter and retaining only the receiver. In either case, the entire outfit may be removed instantly by removing the cap.

As has been suggested above, my telephone outfits may be used in any desired systems of circuits. If desired, the two receivers may be included in independent systems so that the operator may both transmit and receive in one system while the other receiver, connected in another system, permits him to hear all orders that are given in that system.

It will be noted that there is a special advantage in my arrangement of a pair of telephone receivers in combination with a transmitter held in front of the mouth. The band encircles the head above the eyebrows and hence is not positively clamped against removing or tilting, yet the weight of the transmitter carried by said band in a position in front of the mouth of the user affords a certain amount of leverage tending to tilt the band upwardly at the rear. This tendency is resisted by having a pair of supported receivers encircling the ears and resiliently clamping the head between them. The clamping action tends to resist removal and inclusion of the entire ear within the cavity tends to afford a semi-positive lock tending to resist removal.

My sending and receiving sets and the wiring constituting my intercommunicating system, as described above, may be so designed, constructed, and installed as to constitute a practical fool proof, waterproof outfit, adapted to stand the roughest usage and to operate successfully under the most trying conditions without interference of extraneous sounds, however violent, and to remain in perfect operating condition for an indefinite length of time in any climate.

The head gear for supporting the telephone set may be made of noncorrodible material, such as gutta percha, rubber, copper, brass, or bronze, or if desired spring steel having a copper welded coating may be used. A satisfactory quality of duplex metal for such purposes is now a common article of manufacture and sale. The exterior transmitter and receiver cases 9 and 10 may be made of the same material. The same is true of the diaphragm 52, though as above mentioned, Tobin bronze is perhaps as good a material as any for this purpose. The receiver diaphragm 83 is preferably of magnetic material, such as soft iron, but this may be coated with lacquer or varnish, or may be plated with gold. It may also be made with a copper face welded to the iron back. The connecting wires may all be soldered permanently in place and the empty spaces in the transmitter and receiver cases may be filled with insulating material. These cases are preferably of a single piece of noncorrodible metal formed without joints or seams, and all perforations therein may be hermetically sealed, either by said insulating material or otherwise. Only one of the line connections need extend within the case, since the case itself may be utilized as part of the return circuit, if such arrangement is considered desirable. The closure of the open end of the microphone case may be made perfectly tight by forming the rings 55, 56 of brass or copper and forcing them into the block 40. The encircling walls may then be upset and forced into most intimate engagement with said rings by lateral action of the tool at the time the lip 57 is spun over the front face of the ring 56. The formation of the ring 27, whereby it bears upon the outer face of the ring 56, serves the double function of a frictional lock to hold the ring 27 and also the screw flange 31 tightly in place. After assemblage, all joints may be further sealed by an application of varnish, liquid rubber, or other self-hardening waterproof compound. By embodying all of these features, the transmitter and receiver may be made so perfectly waterproof as to be capable of use for submarine work, as well as for use on ship board and in coast fortifications, where they are exposed to salt sea air and oftentimes to driving storms.

The shields constituting the mouth and ear pieces may be of such material, texture, or construction as will render them efficient nonconductors of sound. These will be such as to prevent collapse under the moderate pressure necessary to hold them in contact with the head of the wearer. Toward the face engaging edges, they may be of soft rubber, as nearly pure rubber gum as may be desired. The face engaging portions may be such as to form a practical air tight and sound proof connection about the face and ears. If desired, these edges may terminate in one or more thin concentric edges of soft rubber projecting after the manner of ruffles, or the edge may be provided with a continuous pneumatic or other face engaging cushion. The transmitter shield is of such length as to permit the vocal vibrations to become fully developed as elastically propagated waves before they reach the diaphragm, and the walls being nonresonant, will prevent any confusing reëchoing effects. The receiver shields should be of the same general structure in that they should be stiff enough to prevent a tendency to collapse when pressed inwardly, as this might tend to produce a capping effect, which would convex the ear drums and impair their sensitiveness. The hair of the head will ordinarily prevent this effect from becoming prominent, but in certain cases I propose to secure a very sound proof fit of these shields by shaving the hair about the ear or plastering it with vaseline. In such case, a valve or vent may be arranged to permit of equalizing external and internal pressure whenever the operator is inconvenienced from internal pressure or vacuum. For many purposes the face engaging portion need not fit the face perfectly, except where used near discharging guns or similar source of violent air waves.

The microphone of the transmitter is a loud speaking microphone insomuch as it magnifies the slighter sounds, thereby producing in the receiver the effect of a comparatively loud voice. At the same time the really loud sounds at the transmitter are suppressed or greatly reduced in the receiver.

The arrangement of circuits shown is well adapted for use in connection with such a transmitter insomuch as the transmitter of the person speaking is not directly in series with his own receiver, the latter being in a parallel circuiting containing the transmitter of the other station. From this arrangement it results that the person speaking is not subject to the disagreeable effect of shouting in his own ear, which would result from a series connection with his own transmitter, and at the same time the outgoing variations are conducted directly to the receiver at the other station without being weakened by the resistance of another receiver in the same circuit. It will be understood that the vibrations in each of the parallel circuits affect the other sufficiently so that each speaker will hear his own voice in his own receiver sufficiently to know that the line is not dead.

The qualities of the microphone make the apparatus suitable for general use in communicating with deaf persons and the transmitter and receiver shields are capable of use in situations where a sound proof telephone booth or cabinet is impracticable.

The various advantages of my waterproof, extraneous sound proof, intercommunicating telephone system will be obvious to those skilled in the art, and the various modifications and omissions of parts for which it is readily adapted will be suggested and controlled by the peculiar demands and exigencies of the various situations and conditions in which it is to be used.

What I claim is:

1. A telephone set comprising a cap or head piece, a transmitter, and a receiver, in combination with transmitter and receiver supports secured to said head piece and connected to said transmitter and receiver to hold the same in predetermined relation to said head piece, said transmitter being provided with a sound concentrating shield adapted to fit the contour of the face of the wearer, and a breathing vent in said shield, said breathing vent being provided with a sound muffling device, for the purpose described.

2. A telephone set comprising a cap or head piece, a transmitter, and a receiver, in combination with transmitter and receiver supports secured to said head piece and connected to said transmitter and receiver to hold the same in predetermined relation to said head piece, said transmitter being provided with a sound concentrating shield adapted to extend about the mouth and nasal opening of the face of the user, and a breathing vent in said shield, said breathing vent being provided with a sound muffling device, for the purpose described.

3. A telephone set comprising a band and a binding screw for adjusting the circumferential extent of said band, in combination with transmitter and receiver supports adjustably secured to said band by binding screw connections, a brace extending from one support to the other, the screw connection for one support being utilized for clamping the brace in place, substantially as described.

4. A telephone set comprising a band and a binding screw for adjusting the circumferential extent of said band, in combination with transmitter and receiver supports adjustably secured to said band by binding screw connections, a brace pivoted to one support and extending to the other, the screw connection for one support being utilized for clamping the brace in place, substantially as described.

5. A combined transmitter and receiver support, comprising a strip of metal, separate screw clamps secured thereon, a transmitter support held by one of said screw clamps and a receiver support held by the other of said screw clamps, in combination with a slotted brace pivoted to said transmitter support below said first mentioned screw clamp, and formed at the other end with a slot extending into operative engagement with the screw clamp of the receiver support for the purpose described.

6. A combined transmitter and receiver support, comprising a strip of metal, separate screw clamps secured thereon, a transmitter support pivoted at one of said screw clamps and a receiver support pivoted at the other of said clamps, in combination with an adjustable brace pivoted to said transmitter support below said first mentioned screw clamp, and extending into operative engagement with the screw clamp of the receiver support, substantially as described.

7. In a telephone head set for combined telephone transmitting and receiving, a band adapted to be secured about the head of the operator above the eyes in an approximately horizontal position, two telephone receivers, resilient members for supporting said telephone receivers from said band so as to elastically clamp the sides of the head at points opposite the ears and thereby resist removal or shifting of position of said band when in place upon the head of the wearer; and a telephone transmitter supported from said band in a pre-determined substantially rigid position in front of the mouth of the wearer, whereby tilting or leverage effect of said transmitter on said band, is resisted by the clamping action of said receivers.

8. In a telephone head set for combined telephone transmitting and receiving, a band adapted to be secured about the head of the operator above the eyes in an approximately horizontal position, two telephone receivers, resilient members for supporting said telephone receivers from said band, so as to elastically clamp the sides of the head at points opposite the ears and thereby resist removal or shifting of position of said band when in place upon the head of the wearer, a telephone transmitter, and supports extending from said band to said transmitter and disposed out of the line of vision of the wearer, said supports holding said transmitter in a predetermined substantially rigid position in front of the mouth of the wearer and movement of said transmitter being resisted by the clamping action of said receivers.

Signed at New York city, in the county of New York and State of New York this sixth day of October A. D. 1908.

MILLER REESE HUTCHISON.

Witnesses:
GEORGE C. DEAN,
IRVING M. OBRIEGHT.

Copies of this patent may be obtained for five cents each, by addressing the "Commissioner of Patents, Washington, D. C."